United States Patent [19]

Schmidlin

[11] Patent Number: 4,462,459

[45] Date of Patent: Jul. 31, 1984

[54] DEVICE FOR AIR CONTROL OF AN ENERGY FACADE WALL

[75] Inventor: Hans Schmidlin, Aesch, Switzerland

[73] Assignee: Eltreva AG, Aesch, Switzerland

[21] Appl. No.: 302,437

[22] PCT Filed: Jul. 21, 1981

[86] PCT No.: PCT/EP81/00102

§ 371 Date: Sep. 4, 1981

§ 102(e) Date: Sep. 4, 1981

[87] PCT Pub. No.: WO82/00337

PCT Pub. Date: Feb. 4, 1982

[30] Foreign Application Priority Data

Jul. 22, 1980 [DE] Fed. Rep. of Germany ....... 3027648
Mar. 28, 1981 [DE] Fed. Rep. of Germany ....... 3112394

[51] Int. Cl.³ ............................ F24H 3/02; F24F 7/08
[52] U.S. Cl. ........................................ 165/54; 165/53; 165/DIG. 12; 165/103
[58] Field of Search ............. 165/16, 35, 49, DIG. 12, 165/53, 54

[56] References Cited

U.S. PATENT DOCUMENTS 2,096,596 10/1937 Sargent ................................. 165/54
3,666,007 5/1972 Yoshino et al. ............. 165/DIG. 12
3,977,466 8/1976 Johansson ................... 165/DIG. 12
4,149,590 4/1979 Ospelt ......................... 165/DIG. 12

FOREIGN PATENT DOCUMENTS

1148723 5/1963 Fed. Rep. of Germany ........ 165/16

Primary Examiner—William R. Cline
Assistant Examiner—Edward P. Walker
Attorney, Agent, or Firm—Michael J. Striker

[57] ABSTRACT

A device for air control for an air ventilated room is provided with an outer pane on its weather side and at its room side with an inner pane. An air channel is formed between the panes for the exhausted room air and a fresh air channel with a weatherside fresh air suction opening and a room side fresh air discharge opening is provided in connection with the air channel. The air channel is connected to a weather side exhaust air opening on its downflow side and is also in connection with a heat exchanger disposed in front of the weather side exhaust air opening through which the exhaust air can transmit heat to the fresh air flowing through the fresh air channel. The air control device is a compact structural unit and is exclusively disposed on the inside of the room. The compact structural unit comprises a separate air control box and a ventilator box.

15 Claims, 13 Drawing Figures

DEVICE FOR AIR CONTROL OF AN ENERGY FACADE WALL

BACKGROUND OF THE INVENTION

The invention relates to a device for air control of an energy facade wall which is provided with an outer window pane on its weather side and at its room side with an inner window pane with an air channel formed therebetween for the exhausted room air and furthermore comprising a channel for fresh air with a weather-side fresh air suction opening and a room side fresh air discharge opening, whereby the air channel is connected with a weather side exhaust air opening on its downflow side and is also in connection with a heat exchanger disposed in front of the weatherside exhaust air opening through which the exhaust air can emit heat to the fresh air flowing through the fresh air channel.

Such a structure is described in the DE-Z.Technik am Bau, No. 4/80 (pages 311,312 and 315). In this case the total air control device including a blower which is provided in the discharge channel as well as a heat exchanger are integrated into a railing element of the face wall. A defined forced path is provided for the exhaust air and the fresh air; a change of the flow paths is not possible.

The heat/cold bridge between the inner and the outer space caused by the structure is disadvantageous. The expensive assembly which must be performed during the foundation work is also disadvantageous because damages may result, as well as the expensive maintenance of the device and the complexity of exchange units caused by the limited structure. The limited controllability is also disadvantageous.

The DE-OS No. 23 30 667 discloses an air conditioning roof device. It is an air conditioning device suitable for outside mounting in particular on the roof of factory halls, or the like, for exhausting exhaust air and for supplying fresh air. In a common housing box a heat exchanger is provided through which the exhaust air and also the fresh air flow, a supply air blower and an exhaust air blower, a supply channel and an exhaust channel, as well as a controllable bypass flap through which the exhaust air inlet side of the heat exchanger is directly connectable with its exhaust air discharge side. Furthermore, a controllable return air flap is provided through which the exhaust air discharge side of the heat exchanger is directly connectable with its supply air discharge opening. The fresh air inlet and the exhaust air discharge of the housing box are designed to be closeable.

This structure is exclusively suitable for air conditioning large rooms, for example, production halls, warehouses, or the like. An individual air conditioning of individual rooms of a building is not possible. Furthermore, it is disadvantageous that the exhaust air is not discharged through an air channel which is formed between an outer pane and an inner pane, as is the case in the known energy facade wall mentioned above. The advantages of such an exhaust air window can be taken from the aforementioned known publication.

SUMMARY OF THE INVENTION

It is an object of the invention to improve the aforementioned device for air control in such a manner that it can be easily installed and is easier to maintain, and that the heat or cold bridges between the inner room and the outer space are eliminated.

This object is obtained in accordance with the invention in that the air control device forms a compact structural unit and is exclusively disposed on the inside of the room.

Thereby it is advantageous that the compact structural unit comprises at least a separate designed air control box and a separate designed ventilator box, whereby the air control box is provided with at least one exhaust inlet opening at the downflow end of the air channel formed between window panes, a fresh air inlet opening connectable to the fresh air suction opening, an exhaust discharge opening connectable to the weatherside exhaust air discharge, and at least two air throughput openings connectable to the ventilator box for the fresh air and the exhaust air, while the ventilator box, which encompasses the heat exchanger and at least one ventilator, is provided with at least two air throughput openings for the fresh air and the exhaust air, connectable to the air control box, as well as the room side fresh air discharge opening.

It can also be advantageous that the compact structural unit comprises an additional air collection pipe which connects the downflow end of the air channel with the exhaust air inlet opening or openings of the air control box. This air collection pipe may be provided at different depths, so as to compensate for different distances between the window frame and the air control device. As is usual, the air collection pipe is at first connected with the window frame. The connected air control box and the ventilator box can be then connected with the air collection pipe in a second phase of the assembly, so as to avoid, in particular damages, during the foundation work.

In order to meet certain criteria for the various structural units, for example, radiators, inner structures, curtains, windows with limited depth, and the like, it is advantageous to use the air control device, with various installation depth. This can be obtained in accordance with the invention in that the air control box and the ventilator box are connected with each other by a connecting pipe for coupling the mentioned air throughput openings. The different air feeding areas are formed by correspondingly disposed partitions in the connecting pipe.

In order to adjust the inventive device to the different requirements during a total year in a simple and energy saving manner, different switchings of the individual air paths are possible. In all alternative solutions the heat energy contained in the exhaust air may be used by closing the bypasses.

The closing members are formed, preferably, by rotating slides; the rotating slides which consist of pipe segments are arranged coaxially and are closed against each other at their front faces by separating walls.

Such rotating slides are known, for example, from the DE-OS No. 29 23 734. The air regulation device disclosed therein must be connected immediately to a window or door frame and therefore has the aforementioned disadvantages.

The housing of the ventilator box may consist of a semi-hard plastic foam which has excellent heat insulating characteristics. This is advantageous for the sound insulation against the weather side as well as with respect to the blowers provided in the ventilator box.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
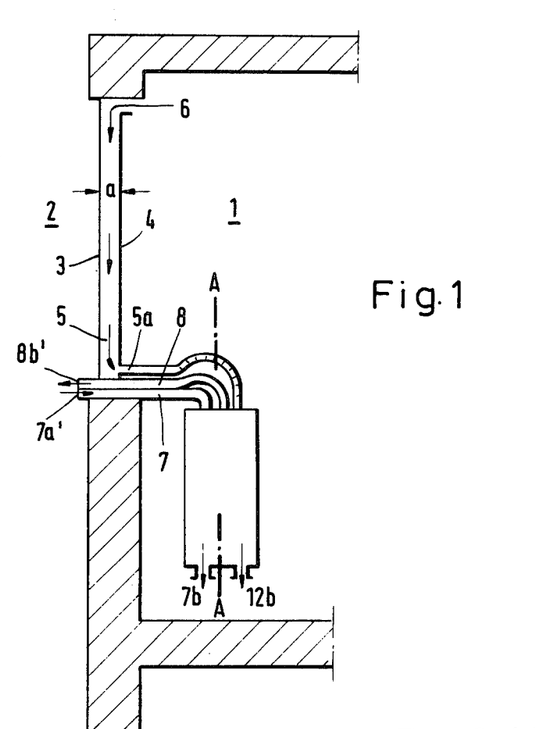
FIG. 1 is a schematic view of a vertical section through a room to be ventilated, with window pane and a device for the air control.
Figure 2:
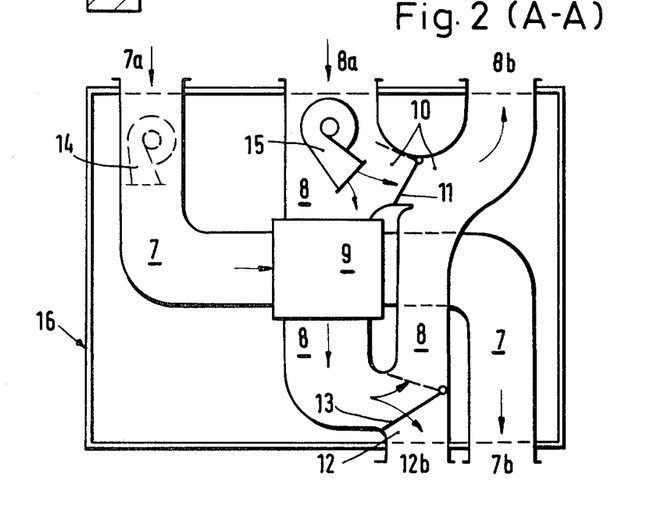
FIG. 2 is a sectional view on an enlarged scale along line A—A in FIG. 1 through the air control device.

In accordance with FIGS. 1 and 2, a room 1 to be ventilated is provided with an outer pane 3 on its weatherside 2 and at its room side with an inner pane 4. An air channel 5 is formed between the outer and the inner panes. Thereby, the distance "a" between the outer and inner panes is only chosen of such a dimension that the room air 6 which flows from the room 1 into the upper side of the air channel 5 provides a defined substantially laminar air flow in air channel 5.

A fresh air channel 7 and an exhaust air channel 8 are provided for ventilating room 1. The exhaust air channel is provided at its room side with an inlet opening 8a and at the weather side 2 with an exhaust air discharge opening 8b'. The fresh air channel 7 is provided with a fresh air suction opening 7a' at the weather side 2 and at the room side with a fresh air discharge opening 7b. The medium of the two mentioned channels 7,8 are in a joint heat transmitting connection by means of a heat exchanger 9 through which the medium flows.

The air channel 5 which is formed by panes 3,4 is connected with its downflow end 5a to the exhaust air inlet opening 8a. Furthermore, seen in the flow direction, a bypass 10 is connected to the exhaust air channel 8 in front of the heat exhanger 9, whereby the bypass is totally or partially controllable by a closing member 11 and immediately leads to the weatherside exhaust discharge opening 8b. Furthermore, a return air channel 12 is connected to the exhaust air channel 8 behind the heat exchanger 9, seen in the flow direction, discharging into the room through a return discharge opening 12b. A second closing member 13 is provided in the mentioned connection area by which the exhaust air channel 8 or the return air channel 12 are totally or partially closeable.

The flowthrough resistance of the heat exchanger 9 is larger for the exhaust air than the one for the bypass 10, when the first closing member 11 is completely open.

A suction blower 14 is provided in front of the heat exchanger 9 in the fresh air channel 7, seen in the flow direction, which is only required as defined pressure conditions and is therefore shown only in the dotted lines. In front of the bypass 10, seen in the flow direction, a suction blower 15 is provided in the exhaust air channel 8.

As can be seen in FIG. 2, with the exception of air channel 5, all the channels and units are combined into a compact unit 16, which is disposed beneath the panes 3,4 and is provided with the different air inlet and outlet openings.

The mode of operation and many adjustability possibilities of the novel device in accordance with FIG. 2 will be explained in the following for defined operating conditions:

(a) Winter operation (room 1 is not inhibited; therefore fresh air supply is not required).

The warm room air 6 is sucked up by the blower 15 through the air channel 5. The bypass 10 is completely closed by the first closing member 11 (fully drawn position in FIG. 2), while the exhaust air discharge opening 8b is completely closed by the second closing member 13 (shown in dotted lines in FIG. 2). Thereby, the room air 6 flows through the exhaust air channel 8, the heat exchanger 9 and the return air channel 12 through the return air discharge opening 12b back into room 1. If in the fresh air channel 7 no suction blower is provided or if a blower is not switched on, no suction of fresh air occurs, since no vacuum pressure is present in the fresh air channel suction opening 7a'.

If sun rays are present, the outer pane 3 transmits the heat energy from the sun rays to the room air 6 which flows through the room air 6 which is heated accordingly. Thereby the usually present heating unit can be relieved.

If no sun rays are present, the K value, that is, the insulation, is considerably improved due to the laminar air flow in the air channel 5 in the window area.

(b) Winter operation (Outer temperature lower than +5° C., inhabited room).

The suction of the room air 6 is performed in the same manner as explained before under a). The first closing member 11 closes the bypass 10 completely (fully drawn position in FIG. 2), while the second closing member 13 completely closes the return air channel 12 (fully drawn FIG. 2). The suctioned room air flows through the exhaust air channel 8 and the heat exchanger 9 and is exhausted through the exhaust discharge opening 8b or 8b' to the weather side. Due to the suctioning off of the room air 6 a vacuum is generated in the room 1 to be ventilated which usually is sufficient to suction fresh air through the fresh air suction opening 7a' from the weather side. In case that the doors of room 1 are frequently opened, or if they are not closed tightly enough, it is recommended to install a suction blower 14 in the fresh air channel 7, so as to assure a forced fresh air supply.

The suction fresh air flows through the heat exchanger 9 where it takes up the heat transmitted from the exhaust air and then flows through the fresh air discharge opening 7b into the room 1. Thereby, it is possible to additionally heat the discharging fresh air, for example, with electrical heating element.

The advantage of this disposition is the discharge of the consumed room air after removing the heat as well as the supply of heated fresh air.

(c) Winter/summer operation

Due to the sun rays, the energy absorbed by the panes may result in excess temperatures. When the completely closed first closing member 11 shown in FIG. 2 is only somewhat opened, a portion of the air sucked up by the air channel 5 can flow without heat removal directly through the exhaust air discharge opening 8b to the weatherside. Therefore, only a portion of the sucked room air 6 is fed through the heat exchanger 9 and flows from there through the exhaust air discharge opening 8b to the outside.

In the manner a controllable energy recovery is obtained.

(d) Summer operation (no heat recovery).

The sucked room air 6 which is intensely heated in the air channel 5 is directly fed to the weather side, that is, bypassing the heat exchanger 9, when completely opening the first closing member 11 (dotted lines in FIG. 2). The air throughflow resistance in the heat exchanger is about 3 to 5 mm water column, so that at a completely opened first closing member 11 practically no room air flows through the heat exchanger 9. Due to this arrangement, the comfort behind the panes is increased. Furthermore, in the mentioned position of the first closing member 11, the air control device may be used for cooling the rooms during the night, in particular offices.

Figure 3:
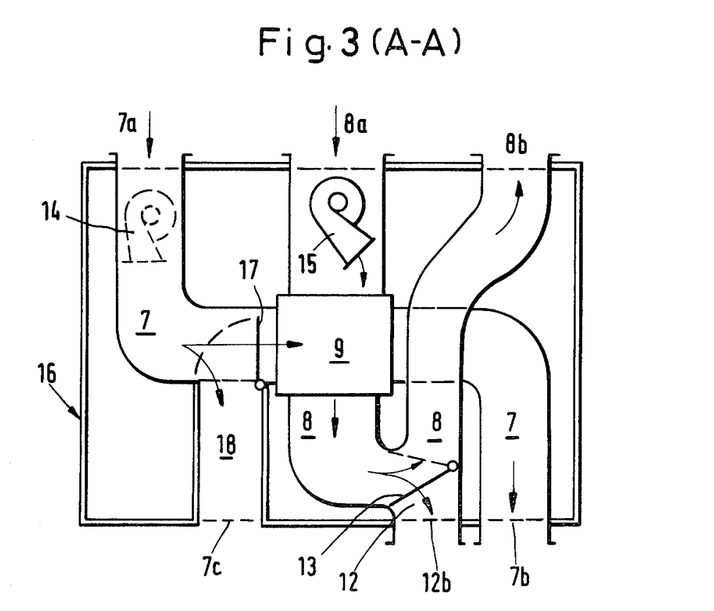
FIG. 3 shows a modified embodiment of the invention.

FIG. 3 shows a further inventive solution. Instead of the bypass 10 provided in the exhaust air channel in accordance with FIG. 2, a bypass 18 is provided in the fresh air channel 7 in front of the heat exchanger 9, seen in the flow direction, which discharges immediately into room 1 to be ventilated by means of a second roomside fresh air discharge opening 7a. This bypass 18 is controllable by a closing member 17.

Figure 4:
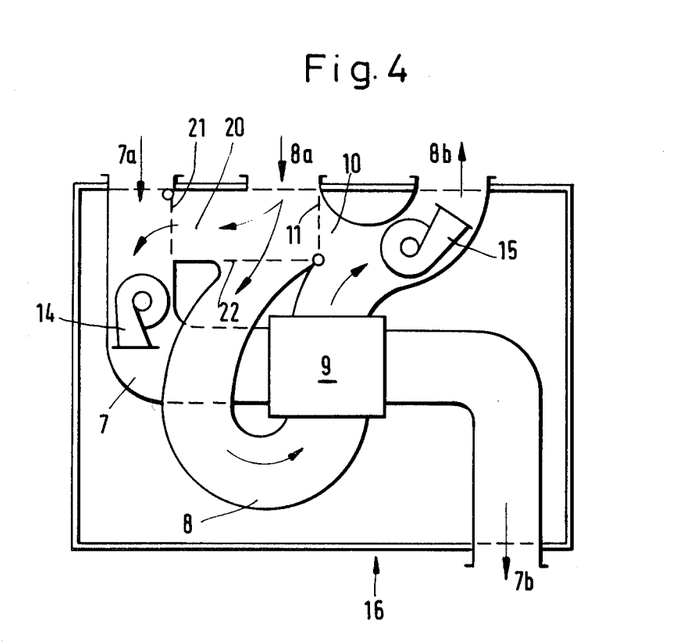
FIG. 4 shows another modified embodiment of the invention.

In another alternative shown in FIG. 4, a mixing channel 20 is connected to the discharge channel 8 in front of the heat exchanger 9, seen in the flow direction, which discharges into the fresh air channel 7. Thereby, a controllable closing member 21 is provided in the connection area of the mixing channel 20 in the fresh air channel 7, with which the mixing channel 20 or the fresh air channel 7 can be completely or partially closeable. A blower 15 is mounted in the exhaust air channel 8 behind the heat exchanger 9 and behind the discharge of the bypass 10. A blowr 14 is provided in the fresh air channel 7 behind the discharge of the mixing channel 20. Furthermore, a further controllable closing member 22 may be provided in the exhaust air channel 8 in front of the heat exchanger 9 with which the discharge channel is closeable.

FIGS. 5a–5e schematically show five different arrangements of the novel air regulation device. In all five embodiments the air control unit comprises at least a separately designed air control box 31 as well as a separately designed ventilator box 32, which encompasses the heat exchanger 9, as well as the blowers or ventilators. In addition, the compact structural unit comprises an air collection pipe which connects the downflow end 5a of the air channel 5 with the exhaust inlet opening or openings 8a of the air control box 31. This air collection pipe may be provided at different depths, so as to compensate for different distances between the window frame and the air control device (embodiments of FIGS. 5a and 5b).

Figure 5A:
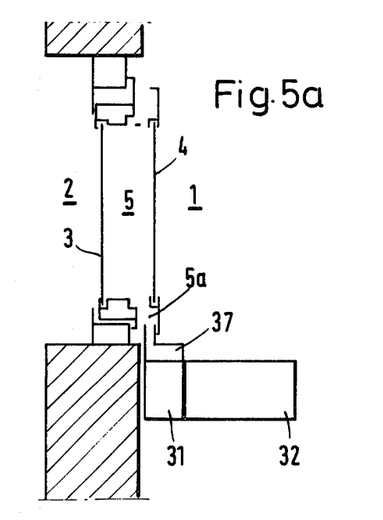
FIGS. 5a-5e show five different arrangements of the air regulation device.
Figure 5B:
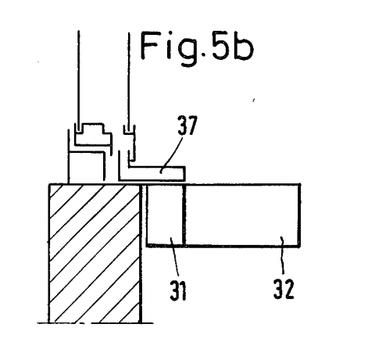
Figure 5C:
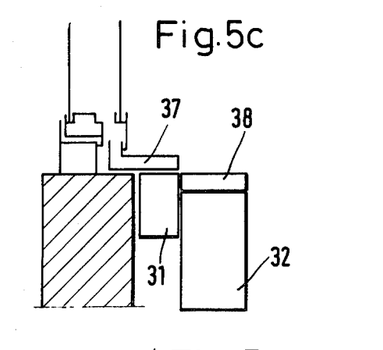
Figure 5D:
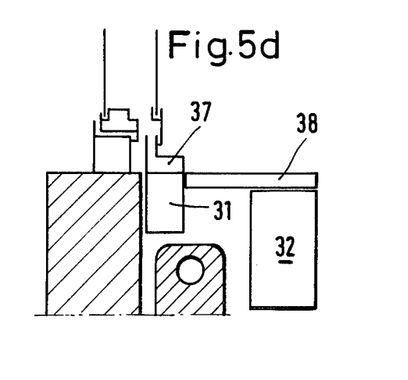
Figure 5E:
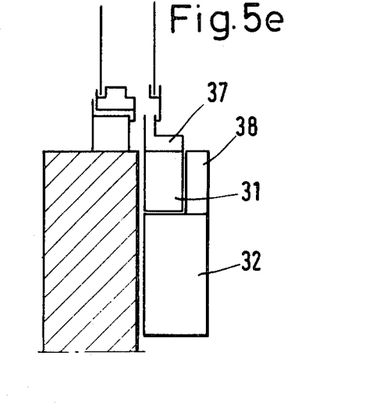

In order to provide a variable installation depth for the air control device, the air control box 31 and the ventilator box 32 may be connected with each other by a connecting pipe 38 (embodiments of FIGS. 5c–5e).

FIGS. 6a–6d show four different switching positions a to d of the air control device in accordance with FIG. 4, wherein the air control device consists of an air control box 31 and a ventilator box 32 which are shown side by side at a distance to each other, so as to show the flow conditions. In reality, the two mentioned structural units are immediately connected with each other or by a connection pipe 38 which has been explained in detail heretofore.

The air control box 31 comprises a rotating slide 39 of which only the rotating axis is shown in the front wall of the air control box. This rotating slide 39 consists of a plurality of coaxial pipe segments 39a,39b,39c (see FIG. 6d) which are closed against each other at their front faces by separating walls. Each of these pipe segments is associated with an air throughflow opening namely a first opening 33 for the fresh air channel 7, a second opening 34 for the intake of the exhaust channel 8 and the mixing channel 20, a third opening 35 for the bypass 10 and a fourth opening 36 for the return flow of the exhaust air channel 8.

The pipe segment which is associated with the air throughflow opening 33 is open in all four shown operating positions, so that the fresh air which comes from the fresh air suction opening 7a, not shown in FIGS. 6a–6d and indicated by an arrow, can enter at the air throughflow opening 33 positioned opposite air control box 31 and can flow out through the air throughflow opening 33 and into the ventilator box 32.

In the shown embodiment, the air control box 31 is also provided with a plurality of exhaust air inlet openings 8a.

The ventilator box 32 comprises the blowers 14,15, the heat exchanger 9 as well as the room side fresh air discharge opening 7b.

Figure 6A:
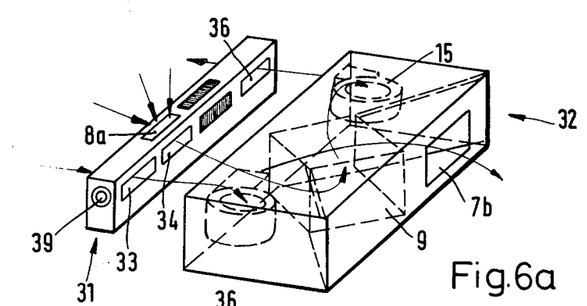
FIGS. 6a-6d illustrate different switch positions of the air control device in accordance with FIG. 4.

The four switching examples showbn in FIGS. 6a–6d will be explained briefly as follows:

(a) This is a normal adjustment at winter operation. The bypass 10 and the mixing channel 20 are closed. The fresh air flows through the heat exchanger 9, is heated by the exhaust air and then flows through the fresh air discharge opening 7b into the inner room, while the exhaust air flows back to the exhaust air discharge opening 8b (see the schematic view in FIG. 4).

Figure 6B:
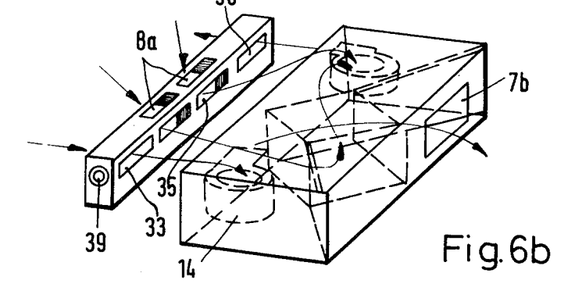

(b) This is a circuit for summer operation, whereby the inner room to be air conditioned is too hot. The bypass 10 is half open, so that about half of the exhaust air quantity bypasses the heat exchanger 9 and flows directly to the exhaust air discharge opening 8b, while the remainder quantity of the exhaust air is fed to the heat exchanger 9 and lightly heats the fresh air. The closing members 11 and 22 shown in FIG. 4 are in a half open position.

Figure 6C:
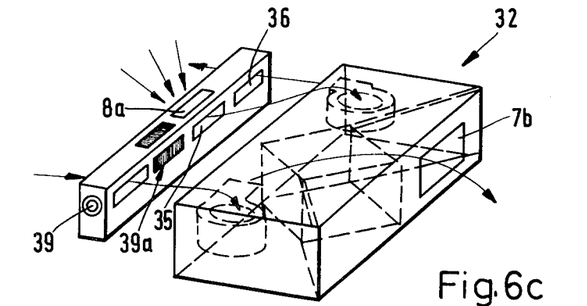

(c) This is a summer operation without heat recovery. The closing element 11 and thereby the bypass 10 are open. The closing member 22 is closed and thereby the exhaust channel 8, as well as the closing member 21 and thereby the mixing channel 20. Thereby, the total exhaust air is fed directly to the weather side bypassing the heat exchanger 9. Therefore, the fresh air is fed to the air conditioned inner room without being heated.

Figure 6D:
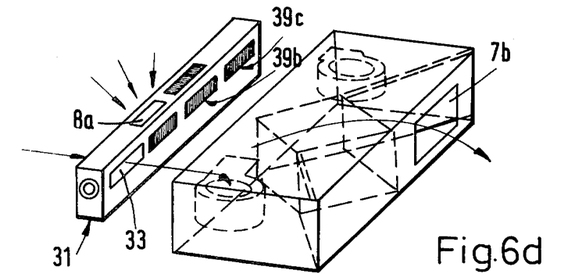

(d) Shown is a circuit for return air operation. The closing member 22 is closed, while the closing member 21 and thereby the mixing channel 20 are open. The bypass 10 is closed by the closing element 11. The fresh air inlet opening 7a is closed, so that no fresh air can be suctioned. Instead, the total exhaust air is fed through the mixing channel 20 and the throughflow opening 33 into the fresh air channel 7 and flows through the heat exchanger 9 (without any effect) and flows through the "fresh air discharge opening" 7b into the inner space. Therefore, the flow path which is usually associated with the fresh air is now associated with the exhaust air during the return air operation.

It will be understood that each of the elements described above, or two or more together, may also find a useful application in other types of devices for air control of an energy facade wall differing from the types described above.

While the invention has been illustrated and described as embodied in a device for air control of an energy facade wall, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A ventilation device for a room ventilated by air circulation and including a window having an outer pane (3) on the weather side of the room and an inner pane (4) on the room side, said panes being spaced from each other to form therebetween an air channel (5) having an inlet end connected to the room and an outlet end and receiving air sucked from the room, the ventilation device being formed with a fresh air channel (7) having a fresh air suction opening (7a') at said weather side and a fresh air discharge opening (7b) at said room side, and an exhaust air channel (8) having an exhaust air discharge opening (8b') at said weather side and an exhaust air
    inlet opening (8a) connected to said air channel (5) between said panes at said outlet end (5a) of said air channel, said ventilation device further comprising a heat exchanger (9) operatively connectable with said fresh air and exhaust air channels and adapted to transmit heat from exhaust air in said room to the fresh air flowing through said fresh air channel; said ventilation device being formed as an air controlling compact structural unit (16) disposed exclusively inside of the room to be ventilated and connected immediately to said air channel (5) at said outlet end thereof and further including at least one separate air control box (31) and at least one separate ventilator box (32) encompassing said heat exchanger.

2. The device as defined in claim 1, wherein said air control box is formed with at least one said exhaust inlet opening (8a) connected to said outlet end (5a) of said air channel (5) and further includes a fresh air inlet opening (7a) connectable to said fresh air suction opening (7a'), a further exhaust air discharge opening (8b) connectable to said exhaust air discharge opening (8b') at said weather side, at least two air passing openings (33, 34, 35, 36) for fresh air and exhaust air and connectable to said ventilator box, and wherein said ventilator box includes at least one blower disposed near said heat exchanger and is provided with at least two air passing openings for fresh air and exhaust air connectable to said air control box, said fresh air discharge opening (7b) being formed in said ventilator box.

3. The device as defined in claim 2, whein said compact structured unit further includes an air connection pipe (37) which connects the outlet end (5a) of the air channel (5) to the exhaust air inlet opening (8a) arranged in the air control box (31).

4. The device as defined in claim 3, wherein the air control box (31) and the ventilator box (32) are connected to each other by a connecting pipe (38) for coupling said air passing openings (33, 34, 35, 36) to said ventilation box.

5. The device as defined in claim 2, wherein said air control box further comprises a first controllable shut off member (11) and is formed with at least partially closable bypass (10) which is connected to the exhaust air channel (8) in front of the heat exchanger (9) as seen in the flow direction through the first controllable shut off member (11) so that said bypass leads immediately to said further exhaust air discharge opening (8b), and wherein a throughflow resistance of said bypass is smaller than that of the exhaust air channel (8) when the shut off member (11) is completely open.

6. The devices as defined in claim 5, wherein said compact structured unit further includes a second controllable shut off member (21) and a third controllable shut off member (22) and is further formed with a mixing channel (20) which is connected to the exhaust air channel (8) in front of the heat exchanger (9) as seen in the flow direction, the mixing channel being discharged into the fresh air channel (7) and being at least partially closeable by the second controllable shut off member (21), while the exhaust air channel (8) is at least partially closeable by the third shut off member (22) disposed in front of the heat exchanger (9) as seen in the flow direction.

7. The device as defined in claim 6, wherein four air passing openings are formed in said air control box to be connected to said ventilator box, said four air passing openings being a first opening (33) for the fresh air channel (7), a second opening (34) for the intake of the exhaust air channel (8) and the mixing channel (20), a third opening (35) for the bypass (10) and a fourth opening (36) for a return flow of the exhaust air channel (8).

8. The device as defined in claim 5, wherein said air control box is formed with a return air channel (12) which is connected to the exhaust air channel (8) behind the heat exchanger (9) as seen in the flow direction, said return air channel being discharged into the room through a return air discharge opening (12b), and wherein a second controllable shut off member (13) is provided at said opening (12b) to selectively and at least partially close the exhaust air channel (8) or the return air channel (12).

9. The device as defined in claim 2, wherein said air control box includes a controllable shut off member (17) and is formed with at least partially closeable bypass (18), said fresh air channel (7) having a further fresh air discharge opening (7c) at said room side, said bypass being connected to the fresh air channel (7) in front of the heat exchanger (9) as seen in the flow direction by means of the shut off member (17) so that said bypass immediately leads to said further fresh air discharge opening (7c), and wherein a flowthrough resistance of said bypass is smaller than that of the fresh air channel (7) when the shut off member (17) is completely open.

10. The device as defined in claim 7, wherein said first and said second controllable shut off members are rotating slides.

11. The device as defined in claim 9, wherein said controllable shut off member is a rotating slide.

12. The device as defined in claim 10, wherein each of said rotating slides includes pipe segments (39a, 39b, 39c) which are arranged coaxially in said control box and are separated from each other by separating walls.

13. The device as defined in claim 11, wherein said rotating slide includes pipe segments (39a, 39b, 39c) which are arranged coaxially in said control box and are separated from each other by separating walls.

14. The device as defined in claim 12, wherein said rotating slides are adjustable.

15. The device as defined in claim 13, wherein said rotating slide is adjustable.

* * * * *